United States Patent [19]
Wallace et al.

[11] Patent Number: 6,104,308
[45] Date of Patent: *Aug. 15, 2000

[54] COMMUNICATION SYSTEM AND METHOD UTILIZING AN INTERFACE PROTOCOL FOR A MULTIPLE DEVICE VEHICLE OCCUPANT RESTRAINT SYSTEM

[75] Inventors: Jon Kelly Wallace, Redford; Russell J. Lynch, West Bloomfield; Scott Kolassa, Farmington Hills, all of Mich.

[73] Assignee: TRW Inc., Lyndhurst, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/887,772

[22] Filed: Jul. 3, 1997

[51] Int. Cl.$^7$ .................................................. G05B 23/02
[52] U.S. Cl. ................................ 340/825.08; 340/825.12; 340/825.07; 370/282; 361/160
[58] Field of Search ......................... 340/825.08, 825.06, 340/825.07, 825.12; 370/201, 204, 282; 361/160

[56] References Cited

U.S. PATENT DOCUMENTS

| | | | |
|---|---|---|---|
| 3,755,782 | 8/1973 | Hass et al. ............................... | 340/147 |
| 4,477,896 | 10/1984 | Aker . | |
| 4,536,887 | 7/1995 | Eisenhuth . | |
| 4,719,616 | 1/1988 | Akano . | |
| 4,740,952 | 4/1988 | Vernieres et al. . | |

FOREIGN PATENT DOCUMENTS

| | | |
|---|---|---|
| 0357038 A2 | 3/1990 | European Pat. Off. . |
| 0421471 A1 | 4/1991 | European Pat. Off. . |
| 2535926 | 5/1984 | France . |
| 0610294940 | 12/1986 | Japan . |
| 2130457 | 5/1984 | United Kingdom . |
| 2291769 | 1/1996 | United Kingdom . |
| WO/8905074 | 6/1989 | WIPO . |
| WO/9524787 | 9/1995 | WIPO . |

OTHER PUBLICATIONS

A SAE publication entitled "Bus System for Wiring Actuators of Restraint Systems", by Bauer et al., and believed to have been published in 1996.

*Primary Examiner*—Michael Horabik
*Assistant Examiner*—Anthony A. Asongwed
*Attorney, Agent, or Firm*—Tarolli, Sundheim, Covell, Tummino & Szabo L.L.P.

[57] ABSTRACT

A communication system (10) for use in a vehicle occupant restraint system (12). A central controller (14) is connected to a plurality of restraint devices (16) by a power and communication conductor (20). A signal function (28), via a voltage modulator (30), of the central controller (14) sequentially outputs voltage modulation messages to the restraint devices (16) on the conductor (20). The application sequence of the voltage modulation messages corresponds to a predetermined sequence of the restraint devices (16). A signal function (40), via a current draw modulator (42), in each of the restraint devices (16) outputs current modulation messages to the central controller (14) on the conductor (20). The application of the current modulation message from each respective restraint device (16) coincides with the outputting of a voltage modulation message from the central controller (14) to another specified one of the restraint devices.

21 Claims, 3 Drawing Sheets

6,104,308

COMMUNICATION SYSTEM AND METHOD UTILIZING AN INTERFACE PROTOCOL FOR A MULTIPLE DEVICE VEHICLE OCCUPANT RESTRAINT SYSTEM

TECHNICAL FIELD

The present invention is generally directed to a communication system and is particularly directed to a system for communication between a central unit and a plurality of remote units via a common electrical conductor.

BACKGROUND OF THE INVENTION

As the sophistication of vehicle occupant restraint systems has increased, the number and complexity of vehicle occupant restraint devices has increased. In response to the increased number of devices, there has been a movement toward centralized control of the devices to reduce cost and increase reliability of the overall restraint system. This change in the design approach for restraint systems brought about a need to design new arrangements for power distribution and data communication between a central controller and the devices.

SUMMARY OF THE INVENTION

The present invention provides a system for communication between a central unit and a plurality of remote units. An electrical conductor interconnects the central unit and the remote units and conducts electrical energy. Voltage modulation means, associated with the central unit, modulates voltage of the electrical energy to send data from the central unit to the remote units over the conductor. A plurality of current modulation means modulate current of the electrical energy. Each of the current modulation means is associated with one of the remote units and modulates current to send data from the associated remote unit to the central unit over the conductor. The sending of data from the remote units to the central unit occurs simultaneously with the sending of data from the central unit to the remote units. A plurality of control means control the plurality of current modulation means. Each of the control means is associated with one of the current modulation means and controls the associated current modulation means to send the data from the associated remote unit to the central unit during sending of data from the central unit to a remote unit other than the associated remote unit.

The present invention further provides a method for communicating between a central unit and a plurality of remote units. An electrical conductor is connected to the central unit and the remote units and conducts electrical energy. The voltage of electrical energy on the conductor is modulated by voltage modulation means associated with the central unit to send data from the central unit to the remote units over the conductor. The current of the electrical energy on the conductor is modulated by a plurality of current modulation means. Each current modulation means is associated with one of the remote units and modulates current to send data from the associated remote unit to the central unit over the conductor. The sending of data from the remote units to the central unit occurs simultaneously with the sending of data from the central unit to the remote units. Each of the plurality of current modulation means is controlled by an associated control means to send the data from the associated remote unit to the central unit during sending of data from the central unit to a remote unit other than the associated remote unit.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF PREFERRED EMBODIMENT

Figure 1:
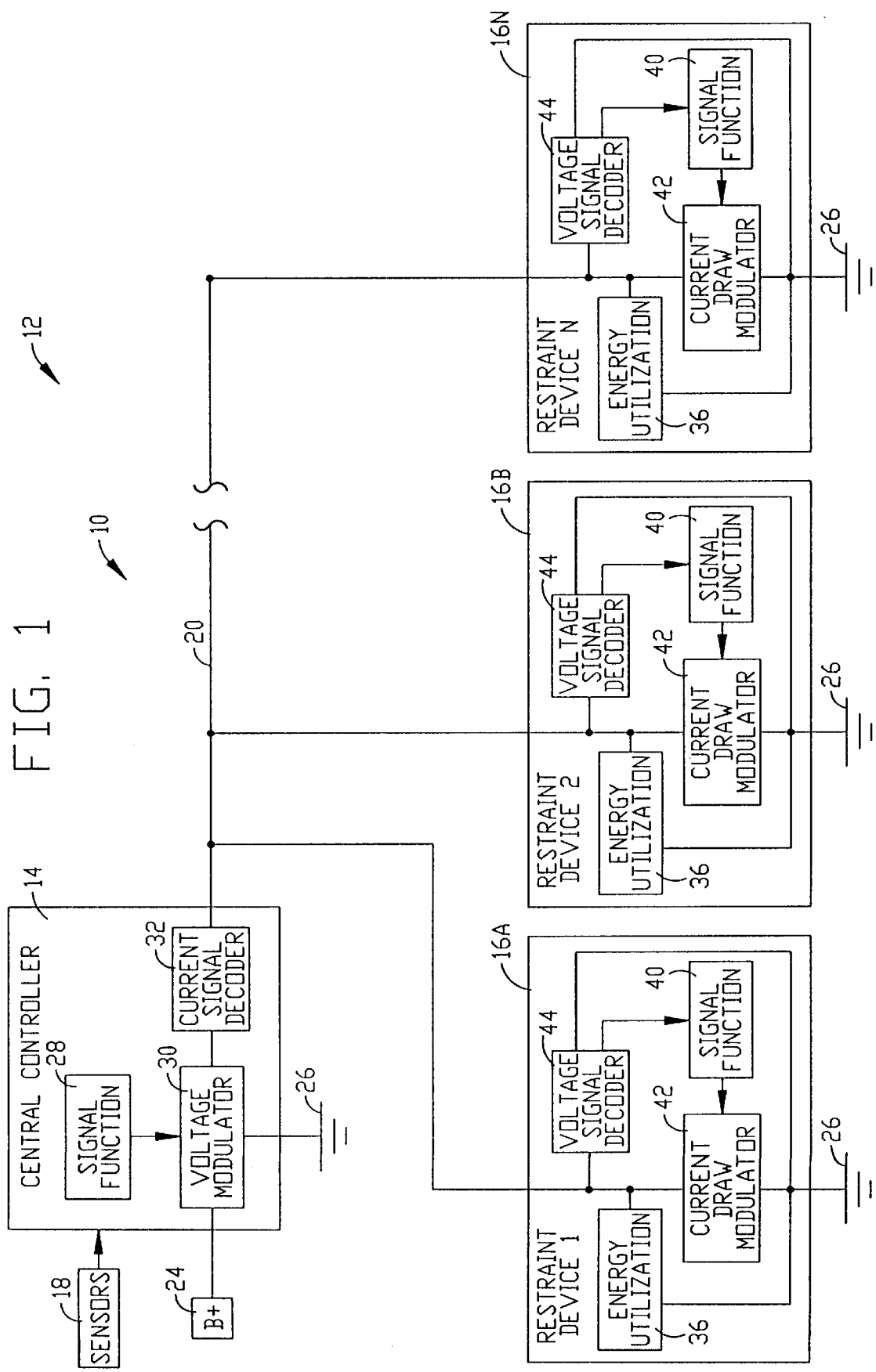
FIG. 1 is a schematic illustration of a vehicle occupant restraint system having a communication system in accordance with the present invention.

One representation of the present invention is schematically shown in FIG. 1 as a communication system 10 for a vehicle occupant restraint system 12. The restraint system 12 has a central controller 14 and a plurality of actuatable restraint devices 16 (e.g., air bag modules, seat belt pretensioners, etc.).

The central controller 14 is connected to receive signals from one or more sensors 18 regarding operation characteristics of the vehicle. In one preferred embodiment, the sensors 18 include an acceleration sensor for detecting sudden vehicle deceleration, such as would occur during a vehicle collision. The central controller 14 determines whether to actuate one or more of the restraint devices 16 in response to information contained within the signals from the sensors 18. A person of ordinary skill on the art will appreciate that upon the occurrence of a vehicle condition indicative of a situation in which the occupants are to be restrained (e.g., a predetermined type of vehicle collision), the central controller 14 causes actuation of the restraint devices 16.

The restraint devices 16 are remote from the central controller 14. A power and communications conductor 20 interconnects the central controller 14 and the plurality of restraint devices 16. The conductor 20 is an electrical conductor and, in one preferred embodiment, the conductor is a wire.

The central controller 14 is connected to a source of electrical energy 24, such as a battery of the vehicle, through suitable power regulation means. The central controller 14 is also connected to electrical ground 26. The central controller 14 uses electrical energy from the energy source 24 to power itself. Also, the central controller distributes electrical energy from the energy source 24 to the restraint devices 16 via the conductor 20.

The central controller 14 includes a signal function 28 for generating data messages intended for the restraint devices 16. A voltage modulator 30 of the central controller 14 is connected to the signal function 28. The voltage modulator 30 is also connected to the energy source 24, electrical ground 26, and the conductor 20. The voltage modulator 30 modulates (i.e., varies) the voltage potential applied to the conductor 20 by the central controller 14. Modulation of the voltage by the voltage modulator 30 is controlled by the signal function 28 such that voltage signals containing data messages from the signal function 28 are outputted from the central controller 14 onto the conductor 20.

The central controller 14 further includes a current signal decoder 32 for monitoring current flow through the conductor 20. Signals, in the form of modulating electrical current, occur on the conductor 20 and are intended for the central controller 14. By monitoring the current flow through the conductor 20, the current signal decoder 32 decodes data massages contained within the modulating current signals on the conductor 20.

In addition to being connected to the conductor 20, each of the restraint devices 16 is connected to electrical ground 26. Each of the restraint devices 16 includes an energy utilization aspect 36 which utilizes electrical energy drawn from the conductor 20. For example, in the preferred embodiment, the restraint devices 16 include air bag modules which have electrically actuatable squibs which have an electrical utilization aspect, i.e., the required energy to ignite. Upon actuation, the squibs cause ignition of gas generating material and/or release of stored gas to inflate associated air bags. The restraint devices 16, in accordance with the preferred embodiment, also utilize electrical energy for communication functions. Other functions that are performed by the restraint devices 16 during routine (i.e., non-collision) operation of the vehicle that require electrical energy and communications include self-diagnostic tests.

A signal function 40 of each of the restraint devices 16 generates data messages intended for the central controller 14. A current draw modulator 42, within each restraint device 16, is connected to the signal function 40. The current draw modulator 42 is also connected between the conductor 20 and electrical ground 26. The current draw modulator 42 modulates (i.e., varies) the current flowing through the conductor 20. Modulation of the current draw is controlled by the signal function 40 such that current modulation signals containing the data messages are outputted from the restraint device 16 onto the conductor 20. The current modulation messages are intended for the central controller 14.

Each of the restraint devices 16 includes a voltage signal decoder 44 connected between the conductor 20 and electrical ground 26. The voltage signal decoder 44 decodes data messages contained within the voltage modulation signals on the conductor 20. The voltage signal decoder 44 is also connected to the signal function 40.

The voltage signals are provided by square wave modulation between a low voltage $V_L$ and a high voltage $V_H$. In the example shown in FIG. 2, a steady-state voltage value (either low $V_L$ or high $V_H$) for a bit duration represents the binary value of zero and a toggled voltage value (either low-to-high or high-to-low) during a bit duration represents the binary value of one. Further, the voltage value is toggled (either low-to-high or high-to-low) at the end of each bit duration. The voltage signals (FIG. 2) are outputted serially from the central controller 14 in groups which define data words. One or more data words provides a data message. It will be appreciated by a person of ordinary skill in the art that the data words can be of any chosen length, and the data words may have a parity or error correction portion. Preferably, the data words are eight or sixteen bits long, with odd parity.

The low voltage $V_L$ is the normal operating voltage for powering the restraint devices 16. The high voltage $V_H$ (FIG. 2) is a voltage at some level above the low voltage, but yet which is within acceptable parameters for operation of the restraint devices 16. The voltage signal decoder 44 detects the low and high voltages, and determines the contained data message.

At each restraint device 16, the current draw is square wave modulated. Thus, the current flow through the conductor 20, is square wave modulated. The modulation of the current is between a low value $I_L$ and a high value $I_H$. In the example shown in FIG. 2, the low current value $I_L$ at the end of a bit duration (demarcated by a voltage value toggle) represents the binary value of zero and the high current value $I_H$ at the end of a bit duration represents the binary value of one. The current signals (FIG. 2) are outputted serially by the restraint devices 16 in groups which define data words. The data words conveyed via the current signals provide data messages. Further, the data words are of a chosen length and may contain a parity portion.

Current flow at the low value $I_L$ is the result of the "default" or minimum current draw of the restraint devices 16 during routine operation of the restraint system 12. Current flow at the high level $I_{11}$ (FIG. 2) is caused by the current draw modulator 42 (FIG. 1) of one of the restraint devices 16 increasing the current draw through the conductor 20. The modulation of current draw does not interfere with the availability of current for actuating the restraint devices 16.

Figure 2:
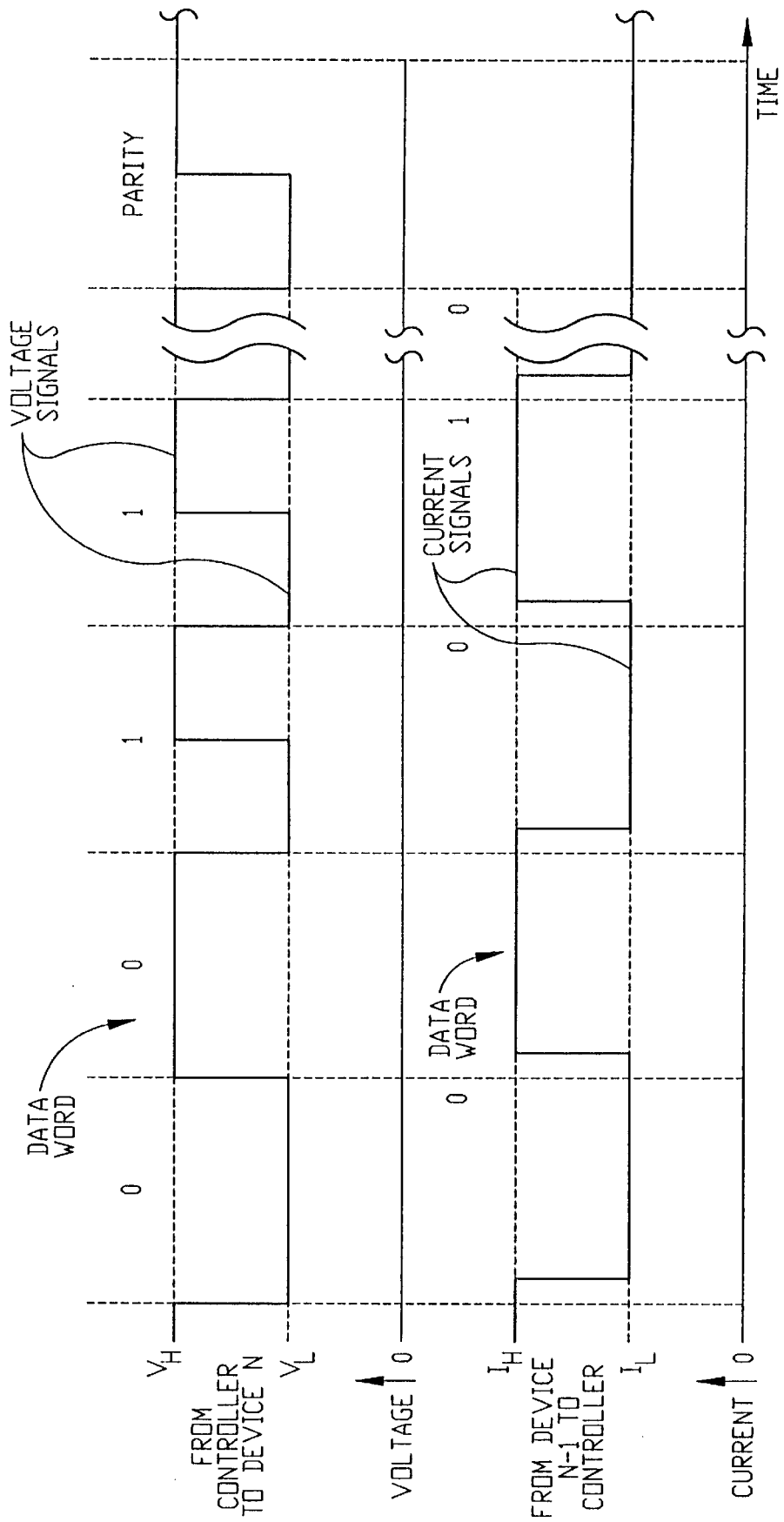
FIG. 2 is a diagram of voltage signals and current signals occurring on a common electrical conductor of the communication system shown within FIG. 1.

Voltage modulation to provide data messages from the controller 14 occurs simultaneously with current modulation to provide data messages from the restraint device 16 (see FIG. 2). Accordingly, the communication between the central controller 14 and the restraint devices 16 is full duplex.

The present invention provides means for enforcing a protocol for communication which obviates the need for an accurate clock source in the restraint devices 16 and the need for communication addressing. Specifically, within the communication system 10, each of the restraint devices 16 "knows" when a voltage modulation message from the central controller 14, which is communicated over the conductor 20, is intended for that restraint device. Also, the central controller 14 "knows" which of the restraint devices 16 is outputting a current modulation message to the central controller.

The communication protocol utilized in the communication system 10 includes the aspect that each voltage modulation message outputted by the central controller 14 during the communication protocol scheme is intended for only one restraint device 16. The protocol also includes the aspect that the central controller 14 proceeds through a predetermined sequence to communicate with each of the plurality of restraint devices 16 in a predetermined order. In the disclosed example, the central controller 14 provides voltage modulation message for each restraint device 16 starting from the first restraint device 16A and proceeding sequentially to the $N^{th}$ restraint device 16N (i.e., from left to right, as shown in FIG. 1). Accordingly, each restraint device 16 "knows" when a data message is directed to it by (1) knowing its place in the prearranged sequence (i.e., its numerical position) and (2) keeping track of the progress through the sequence (i.e., counting voltage modulation messages from the beginning of each sequence).

The communication protocol, in accordance with the present invention, also includes the aspect that only one restraint device 16 provides a current modulation message at a time to the central controller 14 over conductor 20. Further, each restraint device 16 only provides a current modulation message to the central controller 14 during outputting of the voltage modulation message signal from the central controller 14 to the next restraint device in the prearranged sequence. When the voltage modulation message is for the $N^{th}$) restraint device, the current modulation message is from the $(N-1)^{th}$ restraint device. Specifically, the signal function 40 of each restraint device 16 is prevented from providing a current modulation message until its designated time. Accordingly, the central controller 14 "knows" that each current modulation message is from the restraint device (e.g., 16A) which immediately precedes, as per the predetermined sequence, the restraint device (e.g., 16B) to which the central controller 14 is presently providing the voltage modulation message.

Within each restraint device 16 of the disclosed example of the present invention, the tracking function is performed by the voltage signal decoder 44. In one example, the voltage signal decoder 44 of one of the restraint devices 16 counts to the number associated with that restraint device, the voltage signal decoder accepts the present group of voltage signals and decodes the data message for that restraint device. In one example, the counting function is accomplished by counting a start pattern of each message, and, in another example, the counting function is accomplished by counting pauses between messages.

In the disclosed example embodiment, the voltage signal decoder 44 is in communication with the signal function 40. The voltage signal decoder 44 prevents the signal function 40 from causing sending of a current modulation message until the voltage signal decoder 44 has processed a voltage modulation message directed at its associated restraint. When the voltage signal decoder 44 completes reception of the accepted voltage modulation message, the voltage signal decoder instructs the signal function 40 to output its current modulation message, via the associated current draw modulator 42. The outputting of the current modulation message occurs while the central controller 14 is outputting a voltage modulation message to the next restraint device in the sequence.

Figure 3:
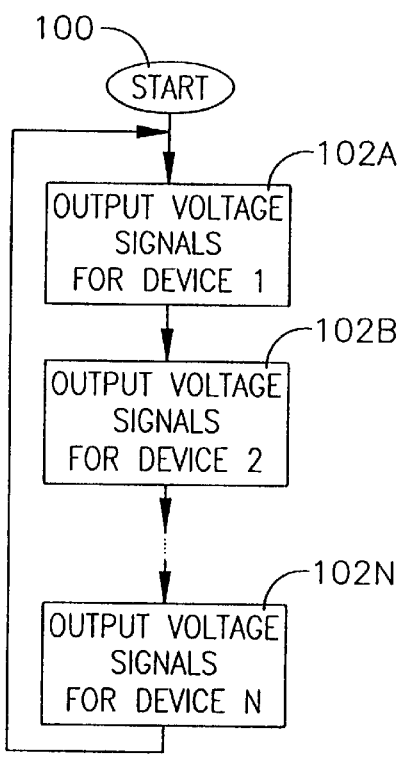
FIGS. 3 and 4 are flowcharts for processes which occur within a central controller shown in FIG. 1.
Figure 4:
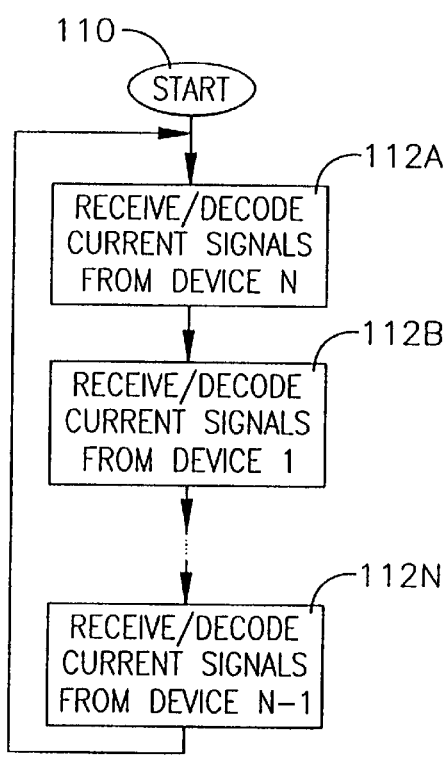

Examples of processes which occur within the central controller are shown in FIGS. 3 and 4. The processes of FIGS. 3 and 4 occur concurrently and, accordingly, the processes are illustrated as having paired steps. The process shown in FIG. 3 is initiated at step 100 and proceeds to step 102A in which a voltage modulation message for the first restraint device 16A is output onto the conductor 20 by the central controller 14. Upon completion of step 102A, the process proceeds to step 102B, in which a voltage modulation message for the second restraint device 16B is output. Upon completion of step 102B, the process proceeds with similar steps (e.g., step 102N) to output voltage modulation messages from the central controller 14 to each of the remaining restraint devices 16 (in sequence). Upon completion of step 102N, the process returns to step 102A.

The process of FIG. 4 is initiated at step 110 and proceeds to step 112A. At step 112A, the current modulation message from the N$^{th}$ restraint device 16N is received and decoded. Step 112A occurs concurrently with step 102A of the process of FIG. 3. Upon the completion of step 112A (FIG. 4), the process of FIG. 4 proceeds to step 112B. At step 112B, the current modulation message from the first restraint device 16A is received and decoded by the central controller 14. Step 112B of the process of FIG. 4 occurs concurrently with step 102B of the process of FIG. 3. Upon the completion of step 112B, the process of FIG. 4 continues for a series of steps for each of the remaining restraint devices 16 in the sequence. Upon the completion of step 112N, the process returns to step 112A.

Figure 5:
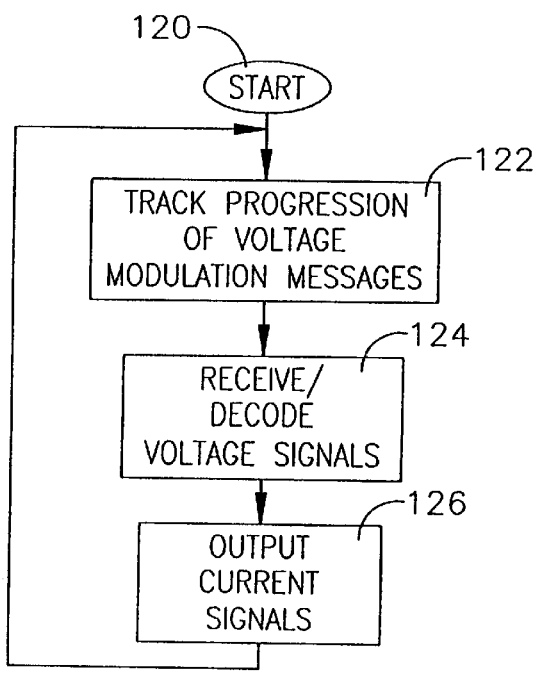
FIG. 5 is a process which occurs within a restraint device shown in FIG. 1.

FIG. 5 is an example of a process which occurs within each of the restraint devices 16. The process is initiated at step 120 and proceeds at step 122. At step 122, the restraint device tracks the progression of the voltage modulation messages from the central controller 14 and awaits the voltage modulation message which is intended for that particular restraint device. When the respective voltage modulation message is outputted from the central controller 14, the restraint device, at step 124, receives and decodes that voltage modulation message. Upon completion of step 124, the process proceeds to step 126 in which the restraint device outputs its current modulation message to the central controller 14. It will be appreciated that simultaneous with the occurrence of step 126 within the specific restraint device, the central controller is outputting a voltage modulation message to the next restraint device 16 in the sequence.

It will be appreciated that the communication system 10 of the present invention may be utilized for systems other than restraint systems.

From the above description of the invention, those skilled in the art will perceive improvements, changes and modifications. Such improvements, changes and modifications within the skill of the art are intended to be covered by the appended claims.

Having described the invention, the following is claimed:

1. A system for communication between a central unit and a plurality of remote units, said system comprising:

an electrical conductor interconnecting the central unit and the remote units for conducting electrical energy;

voltage modulation means, associated with the central unit, for modulating voltage of the electrical energy to send data from the central unit to the remote units over said conductor;

a plurality of current modulation means for modulating current of the electrical energy, each of said current modulation means being associated with one of the remote units and modulating current to send data from the associated remote unit to the central unit over said conductor, the sending of data from the remote units to the central unit occurring simultaneously with the sending of data from the central unit to the remote units; and a plurality of control means for controlling said plurality of current modulation means, each of said control means being associated with one of said current modulation means and controlling said associated current modulation means to send the data from the associated remote unit to the central unit during sending of data from the central unit to a remote unit other than the associated remote unit.

2. A system as set forth in claim 1, wherein said voltage modulation means includes means for providing voltage potential on said conductor, and means for changing the voltage potential between two levels.

3. A system as set forth in claim 1, wherein each of said current modulation means includes means for drawing current from said conductor, and means for changing the current draw.

4. A system as set forth in claim 1, wherein each of the remote devices includes means for receiving operating power for the remote device from said conductor.

5. A system as set forth in claim 1, wherein each of said control means controls said associated current modulation means to send the data from the associated remote unit to the central unit during sending of data from the central unit to a specified one of the remote units.

6. A system as set forth in claim 1, wherein the sending of data to the remote units is in a sequence corresponding to a sequence of the remote units.

7. A system as set forth in claim 6, wherein each of said control means controls said associated current modulation means to send the data from the associated remote unit to the central unit during sending of data from the central unit to a remote unit adjacent to the associated remote unit in the sequence of remote units.

8. A system as set forth in claim 7, wherein the adjacent remote unit is the next remote unit in the sequence of remote units.

9. A system as set forth in claim 1, wherein each of said control means prevents said associated current modulation means from sending data from the associated remote unit while the associated remote unit is receiving data sent to the associated unit and prevents said associated current modulation means from sending data from the associated remote unit until data from the central unit is sent to the another remote unit.

10. A system as set forth in claim 9, wherein the sending of data to the remote units is in a sequence corresponding to a sequence of the remote units.

11. A system as set forth in claim 10, wherein the another remote unit is adjacent to the associated remote unit in the sequence of remote units.

12. A system as set forth in claim 11, wherein the adjacent remote unit is the next remote unit in the sequence of remote units.

13. A method for communicating between a central unit and a plurality of remote units, said method comprising:

connecting an electrical conductor to the central unit and the remote units for conducting electrical energy;

modulating voltage of electrical energy on the conductor by a voltage modulation means associated with the central unit to send data from the central unit to the remote units over the conductor;

modulating current of the electrical energy on the conductor by a plurality of current modulation means, each current modulation means being associated with one of the remote units and modulating current to send data from the associated remote unit to the central unit over the conductor, the sending of data from the remote units to the central unit occurring simultaneously with the sending of data from the central unit to the remote units; and controlling each of the plurality of current modulation means by an associated control means to send the data from the associated remote unit to the central unit during sending of data from the central unit to a remote unit other than the associated remote unit.

14. A method as set forth in claim 13, wherein said step of modulating voltage includes providing voltage potential on the conductor and changing the voltage potential between two levels.

15. A method as set forth in claim 13, wherein said step of modulating current includes drawing current from the conductor and changing the current draw.

16. A method as set forth in claim 13, wherein the sending of the data from the associated remote unit to the central unit is during sending of data from the central unit to a specified one of the remote units.

17. A method as set forth in claim 13, wherein the sending of data to the remote units is in a sequence corresponding to a sequence of the remote units.

18. A method as set forth in claim 17, wherein the sending of the data from the associated remote unit to the central unit is during sending of data from the central unit to a remote unit adjacent to the associated remote unit in the sequence of remote units.

19. A method as set forth in claim 13, wherein the controlling of each current modulation means includes preventing the current modulation means from sending data from the associated remote unit while the associated remote unit is receiving data sent to the associated unit and preventing the current modulation means from sending data from the associated remote unit until data from the central unit is sent to the another remote unit.

20. A method as set forth in claim 19, wherein the sending of data to the remote units is in a sequence corresponding to a sequence of the remote units.

21. A method as set forth in claim 20, wherein the another remote unit is adjacent to the associated remote unit in the sequence of remote units.

* * * * *